2,904,525
STABILIZED VEHICLES FOR LEAFING ALUMINUM COATINGS

Gordon M. Babcock, Plainfield, N.J., and Francis B. Rethwisch and William P. Woosley, Louisville, Ky., assignors to Reynolds Metals Company, Richmond, Va., a corporation of Delaware No Drawing. Application October 18, 1955
Serial No. 541,298

8 Claims. (Cl. 260—21)

This invention relates to the production of improved metallic coatings and particularly aluminum coatings characterized by persistency in leaf retention and color retention when mixed for long periods of time in vehicles which heretofore have not been suitable for this application.

Heretofore, when it has been desired to have aluminum coatings premixed and ready to apply, vehicles which have been especially formulated for leaf retention characteristics have been required. Generally, these vehicles were made with neutral gums, resins and oils. For this reason, good ready mixed aluminum coatings have been made using softer setting type resins, such as paracoumarone indene, and oils with low acid number, such as kettle bodied linseed, kettle bodied fish oil, etc. These have been characterized by holding the leafing and color of the metallic pigment over a period of years.

The use of alkyd, melamine, and other hard setting resins as vehicles with leafing aluminum pigments has, however, been limited to those applications where it is possible to mix the required leafing aluminum pigment just prior to application. In mixes containing such resins, the aluminum pigment loses its leafing power and the bright leafing aluminum color is lost in a few hours time after being in contact with the vehicles.

We have discovered a method of altering any such vehicle, without sacrifice of appearance, hardness, drying time, or other undesirable change. The material made according to this new method will be such as to allow normal packaging, warehousing, shipping, etc. to the point of application where only normal and usual stirring will be required to produce a full leafing, bright finish characteristic of good aluminum paint application.

Alkyd, melamine, ester gum resins, and the like have been, until now, specifically mentioned as unsuitable for this application by leading manufacturers of these products, by manufacturers of aluminum pigments, and by experts in the art of preparing leafing aluminum paints for ready-mixed packaging.

Leafing aluminum pigments, whether in powder or paste form, owe their ability to leaf or float to the surface in a properly prepared vehicle by the oriented layer or layers of fatty materials deposited on the individual flake surfaces during manufacture. Saturated fatty acids, particularly myristic, palmitic, stearic acid, and the like, have been found best through long periods of usage. These acids show relatively weak acid action and low dissociation constants when compared with other types of acids usually associated with varnish and paint materials.

Where acids with very high dissociation constants are present in a vehicle, the more active acids replace or wet the oriented molecules of the weaker fatty acid present on the leafing aluminum flakes. This reduces the interfacial tension between the surface of the aluminum pigment particle and the vehicle, allowing the particles to be "wetted" by the vehicle. This causes loss of the floating or leafing property of the pigment and destroys the pleasing silvery appearance normally associated with good aluminum paint application.

The time required to destroy the leafing property of the aluminum flake pigments depends on the amount of acid and on the dissociation constant of the destructive acid or acids in the vehicle. This time may vary from a few minutes to a few days. Heat and agitation will also accelerate this phenomenon.

We have discovered that it is possible to prevent the above mentioned undesirable effects caused by the strong er, leaf destroying acids in vehicles without affecting the physical characteristics of the applied paint or coating after application, and also to extend for longer periods of time the leafing characteristics of leafing aluminum pigments mixed with them. This is accomplished through the use of a replacement agent in the form of an addition product obtained by the reaction of certain basic organic compounds with saturated fatty acids of the stearic and palmitic type, preferably having a carbon content of at least 12. This agent serves to replace the acids having high dissociation constants with fatty acids having much lower dissociation constants.

The basic organic compound as well as the addition product must be soluble and compatible in usual paint and varnish thinners. For practical purposes this basic organic compound should be stable, freely available at reasonable cost, low in toxicity and low in flammability.

It has been found that many of the commercial grades of amines now on the market are quite suitable for this use, the aliphatic amines being preferred. However, other types of compounds, including amidines, and also ammonium salts of the fatty acids, such as dry, moisture-free ammonium stearate, may be used.

To prepare our replacement agent, chemically equivalent amounts of the fatty acid and the basic organic compound are dissolved in a thinner compatible with the paint vehicle to which it is to be added. Varnolene (a petroleum liquid well known as mineral spirits in the paint trade), xylol, toluol, etc., are suitable. The reagents may be dissolved separately and then combined, or they may be dissolved simultaneously. Heating will effect faster solution and reaction, but is not necessary. Slight excess amounts above the stoichiometric equivalent of the fatty acid may be allowed but proportions of the basic organic compound should not exceed the chemical equivalency.

General chemical equations for obtaining the reaction product would be as follows:

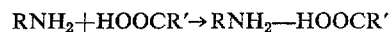

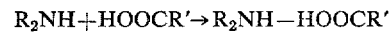

where R is an organic radical, and R' is any saturated organic radical having a carbon content of at least 12 atoms.

A generalized formula for the amine in the above equation typified by dibutyl amine, octadecyl amine, methyl amine and diethyl amine in the specific examples herein is $R_3NHR_4$ where $R_3$ is an alkyl radical and $R_4$ is a radical selected from the group consisting of alkyl and hydrogen.

Thus, the reaction product formed using dibutyl amine $(C_4H_9)_2NH$ and stearic acid $HOOCH_{35}C_{17}$ would be as below:

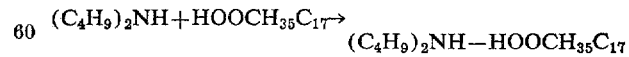

The replacement agent compounded as above may be added at any step in the mixing of the aluminum pigment and the vehicle to be treated. If desired, it may be added to a stable leafing aluminum pigment. In many cases it may be used to make a paste of a leafing aluminum powder, or may be added to a leafing aluminum paste during or after manufacture. A preferred method is to add the required amount to the vehicle itself before the leafing aluminum pigment is added. Since the coating composition may be treated at any of the stages of manufacture, typical formulae will be given for the compositions of these various components.

A general chemical equation for the reaction taking place in a vehicle treated with the above replacement agent solution would be as follows:

$R_2NH.HOOCR' + HOOCR''$
$\rightarrow R_2NH.HOOCR'' + HOOCR'$ where R and R' are as defined above, and R'' is an organic radical in the destructive acid present in the vehicle.

A typical actual chemical equation for the action taking place when a vehicle containing free maleic acid is treated with the replacement agent prepared from dibutyl amine and stearic acid would be:

$2(C_4H_9)_2NH.HOOCH_{35}C_{17} + HOOCH=CHCOOH$
$\rightarrow (C_4H_9)_2NH.HOOCCH$
$=CHCOOH.(C_4H_9)_2NH + 2HOOCH_{35}C_{17}$ and in a vehicle containing free phthalic acid
$C_6H_4(COOH)_2$ $2(C_4H_9)_2NH.HOOCH_{35}C_{17} + (HOOC)_2C_6H_4$
$\rightarrow (C_4H_9)_2NH.HOOC.C_6H_4$
$.COOH.HN(C_4H_9)_2 + 2HOOCH_{35}C_{17}$ and in a vehicle containing free phthalic acid and free formic acid HCOOH $3(C_4H_9)_2NH.HOOCH_{35}C_{17} + (HOOC)_2C_6H_4 + HOOCH$
$\rightarrow ((C_4H_9)_2NH)_2.(HOOC)_2C_6H_4$
$+ (C_4H_9)_2NH.HOOCH + 3HOOCH_{35}C_{17}$ The amount of the replacement agent required to treat a given vehicle will depend on the amount of free acid present in the vehicle. This can be easily determined by methods well known to those skilled in the art. The amount required for the minimum effect would then be that quantity containing the chemical equivalent of the free active acid present in the vehicle.

Thus, for a vehicle containing free acid (phthalic, maleic, or like type) and showing an acid number of 7.58 by A.S.T.M. method D154–50, the minimum amount of the replacement agent to be used (if the latter showed a potential basic activity or potential replacement number as defined below, of 56.1) would be 13.53 grams to 100 grams of vehicle. As a convenient method of calculation to obtain the minimum amount of replacement agent required for 100 grams of vehicle, the following formulae are indicated:

Potential replacement number (mg. per gm. of solution)

$= \dfrac{56,100 \text{ times concentration by weight of basic organic compound in decimal \% in the solution}}{\text{Molecular weight of basic organic compound}}$ Theoretical minimum amt. of replacement agent solution (expressed in grams) to be added to 100 gms. of vehicle $= \dfrac{\text{Acid number of vehicle}}{\text{Potential replacement number}} \times 100$ It is pointed out that while complete replacement of the high dissociation constant acids in the vehicle by our agent will give optimum results, we do not limit our invention to this total replacement, as it is possible to prepare suitable paints with acceptable ready mixed leafing life by only partly eliminating the amount of harmful free acid in the vehicle. By this method, the speed of destroying the leafing effect by the harmful acids is diminished.

Our replacement agent may be effectively employed with many types of vehicles, such as alkyds (including modified alkyds, phthalic alkyds, maleic alkyds, styrenated alkyds, and the like), urea resins, melamines, and any resinous or oleo-resinous combinations containing what we have designated as strong or active acids.

Following are typical vehicles with which our replacement agent may be employed. These vehicles have heretofore been limited to use where it is possible to mix the required leafing aluminum pigment just prior to application, and have produced loss of leafing power of the aluminum pigment in only a few hours:

(A) TYPICAL MODIFIED ALKYD VEHICLE

Rezyl resin solution 412–1 manufactured by American Cyanamid Company.
  Characteristics:
    (a) Percent solids by weight—50%
    (b) Type solvent—mineral spirits
    (c) Weight per gal.—7.8 pounds
    (d) Analysis of solids:
       Phthalic anhydride—30% minimum
       Soya fatty oil acids—50% minimum
    (e) Acid number based on solids—3 to 8

(B) TYPICAL MODIFIED ALKYD-MELAMINE VEHICLE (a) Composition:
   60% rezyl resin solution 412.1
   40% Uformite MM–55 melamine solution manufactured by Resinous Products Div., Rohm & Haas Co.
(b) Rezyl solution explained in (A) above containing phthalic anhydride.
(c) Melamine resin solution is a condensation reaction between melamine and formaldehyde which would contain small amounts of formic acid.
(d) Characteristics of melamine resin solution portion:
   (1) Percent solids by weight—50%
   (2) Percent solvent by weight:
      Butanol—80%
      Xylol—20%
   (3) Acid number based on solids—0 to 2
   (4) Weight per gal.—8.3 pounds (C) TYPICAL STYRENATED ALKYD No. 4250 Styresol manufactured by Reichhold Chemical Co.
   (a) Percent solids by weight—50%.
   (b) Type solvent—xylol
   (c) Solids—an alkyd resin modified by styrene
   (d) Acid number based on solids—7 maximum It is believed that the reaction between our replacement agent and the free high dissociation constant acid in such vehicles as the above is as follows: The reaction product of the saturated fatty acid and the basic organic compound results in a new compound in the form of an addition product. Because of the relatively weak and low dissociation constant of the fatty acid component of this addition product, it is easily replaced by the stronger, high dissociation constant free acid in the vehicle, releasing the weaker, less harmful acid in the vehicle.

This action is illustrated in Chart #1, in which the replacement agent employed was prepared using the following proportions:

| | Grams |
|---|---|
| Dibutyl amine | 12.9 |
| Stearic acid | 28.45 |
| Mineral spirits | 58.65 |
| | 100.00 |

Potential neutralizing number—56.1.

*Chart #1*

| | |
|---|---|
| Type of vehicle | Alkyd-melamine. |
| Percent solids | 50. |
| Acid No. of vehicle | 5.8. |
| Potential replacement number | 56.1 |
| Amount of replacement agent used | 10 grams. |
| Apparent acid No. of treated vehicle | 8.1. |

It is shown in Chart #1 that the free harmful high dissociation constant acid in the vehicle has not been saponified, but has simply replaced the weaker low dissociation constant acid in the replacement agent, thus releasing this acid in the vehicle accounting for the higher apparent acid number of the treated vehicle.

Chart #2 illustrates the prolongation of the leafing effect of leafing aluminum pigment in the types of vehicles described herein, a standard replacement agent solution of a concentration enabling its use with vehicles of varying acid numbers being employed.

Following was the composition:

| | Grams |
|---|---|
| Diethylamine | 10.0 |
| Stearic acid | 38.8 |
| Mineral spirits | 51.2 |
| | 100.0 |

Potential neutralizing number—76.7.

and to which double the stoichiometric amount has been added (2) is illustrated by Chart #4. The leafing action is measured by Reynolds Metals Company creep method after accelerated stability test in an oven at 105° C. for the hours indicated. (References to the Reynolds Metals Company creep method may be found in Gardner's "Chemical & Physical Examination of Paints, Varnishes and Lacquers.") Although the accelerated stability test is not an exact measurement of the normal package stability of an aluminum leafing pigmented paint, it is an excellent comparative measurement. Experience has

Chart #4

| Vehicle | Amount standard replacement agent solution, gr./100 gr. | Leafing on accelerated stability test in oven at 105° C. | | | | |
|---|---|---|---|---|---|---|
| | | Initial | 17 hrs. | 73 hrs. | 139 hrs. | 251 hrs. |
| Styrenated alkyd pigmented 1½ pounds per gallon with a standard lining grade aluminum paste:[1] | | | | | | |
| (a) Untreated | None | 40 | 25 | 15 | 13 | None |
| (b) Treated [2] | 3.9 | 42 | 40 | 40 | 30 | 25 |
| (c) Treated [3] | 7.8 | 38 | 35 | 40 | 40 | 40 |
| Alkyd melamine pigmented 1½ pounds per gallon with a standard lining grade aluminum paste:[1] | | | | | | |
| (a) Untreated | None | 50 | None | None | None | None |
| (b) Treated [2] | 5.4 | 45 | 20 | 5 | None | None |
| (c) Treated [3] | 10.8 | 42 | 35 | 45 | 35 | 45 |

[1] A standard lining grade paste is a dispersion of leafing aluminum pigment in a solvent. The pigment content, which is roughly 65% of the paste, will show a maximum screen retention of 1.0% on a 325 mesh sieve. A typical example of this is Reynolds #30 Paste. It should be understood, however, that any grade of stable leafing aluminum pigment may be used.
[2] The stoichiometric amount of replacement agent solution was added to the vehicle.
[3] Double the stoichiometric amount of replacement agent solution was added to the vehicle.

Chart #2

| Type of vehicle | Acid number based on solids | Amount SRA sol.[1] per 100 gms. vehicle, grams | Leaf retention | |
|---|---|---|---|---|
| | | | In oven at 105° C., hours | Shelf stability, normal storage, days |
| Alkyd melamine | 5.6 | None | Less than 1 | 1. |
| Alkyd | 8.0 | None | 1 | 4. |
| Phenolic alkyd | 16.0 | None | 50 | 40. |
| Alkyd melamine | 5.6 | 5 | 50 | More than 720. |
| Alkyd | 8.0 | 5 | 50 | 180. |
| Phenolic alkyd | 16.0 | 5 | 200 | More than 270. |

[1] Standard replacement agent solution.

As shown in Chart #2, a standard solution may be used for different type vehicles. However, the effectiveness of such a standard solution may vary somewhat according to the particular vehicle employed.

The action of the replacement agent solution of Chart #1 on the vehicles discussed herein is illustrated by Chart #3 below. Viscosities listed were obtained by use of a No. 4 Ford Cup and are expressed in seconds.

Chart #3

| Vehicle | Amt. SRA[3] solution, gr./100 gr. | Viscosity on accelerated stability test in oven at 105° C. | | | | |
|---|---|---|---|---|---|---|
| | | Initial | 17 hrs. | 73 hrs. | 139 hrs. | 251 hrs. |
| Styrenated alkyd: | | | | | | |
| (a) Untreated | None | 23.5 | 22.0 | 22.8 | 24.0 | 24.2 |
| (b) Treated [1] | 3.9 | 23.5 | 22.0 | 22.2 | 23.3 | 24.4 |
| (c) Treated [2] | 7.8 | 23.5 | 21.5 | 22.2 | 23.8 | 24.8 |
| Alkyd melamine: | | | | | | |
| (a) Untreated | None | 23.5 | 23.2 | 23.8 | 29.5 | 32.0 |
| (b) Treated [1] | 5.4 | 23.5 | 23.4 | 24.5 | 30.3 | 34.4 |
| (c) Treated [3] | 10.8 | 23.5 | 22.5 | 22.8 | 29.3 | 31.7 |

[1] The stoichiometric amount of replacement agent solution was added to the vehicle.
[2] Double the stoichiometric amount of replacement agent solution was added to the vehicle.
[3] Standard replacement agent solution.

The prolonged leafing life of two different aluminum pigmented vehicles to which the stoichiometric amount of the replacement agent of Chart #1 has been added (1)

shown that 100 hours of accelerated treatment can be considered the equivalent of three months normal package stability.

EXAMPLES (a) Prepared replacement agents for use with various types of vehicles:

(1) Dibutylamine _____ grams__ 12.9
    Stearic acid _____ do____ 28.45
    Mineral spirits _____ do____ 58.65
    Potential replacement number or potential neutralizing number _____ 56.1

(2) Octadecylamine _____ grams__ 26.95
    Stearic acid _____ do____ 28.45
    Mineral spirits _____ do____ 44.60
    Potential replacement number or potential neutralizing number _____ 56.1

(3) Methylamine _____ grams__ 3.10
    Stearic acid _____ do____ 28.56
    Mineral spirits _____ do____ 68.45
    Potential replacement number or potential neutralizing number _____ 56.1

(b) Ready-mixed aluminum paint: Lbs.
(4) Standard lining aluminum paste _____ 1.6
    Rezyl 412–1 solution _____ 5.8
    Mineral spirits _____ 0.5
    High flash naphtha _____ 0.5
    Dibutylamine-stearic acid replacement agent (potential neutralizing number of 56.1) ___ 0.35
                                                                    8.75

(5) Standard lining aluminum paste _____ 1.5
    Styresol #4250 _____ 4.8
    Xylol _____ 1.0
    Toluol _____ 1.0
    Diethylamine-stearic acid replacement agent (potential neutralizing number of 56.1) _____ 0.2
                                                                    8.5

(c) Aluminum paste:

Should it be desired to incorporate the replacement agent with the leafing aluminum pigment, the following is given as an example of a composition to be used at 1.3 pounds per gallon of a vehicle showing an acid number of not greater than 8.0.

|  | Lbs. |
|---|---|
| (6) Leafing aluminum pigment | 65.0 |
| Replacement agent (Example 1) | 30.0 |
| Mineral spirits | 35.0 |
|  | 130.0 |

(d) Vehicle:

|  |  |
|---|---|
| (7) Rezyl 412–1 solution | 5.8 |
| Replacement agent (Example 1) | 0.35 |
|  | 6.15 |

Having described our invention, what we claim and desire to secure by Letters Patent is as follows:

1. A film-forming hard synthetic resin composition comprising leafing aluminum pigment, hydrocarbon thinner, a synthetic resin selected from the group consisting of alkyd resin having an acid number less than about 8, a styrenated alkyd resin having an acid number of less than about 8, and mixtures of one of said alkyd resins with a melamine-aldehyde resin, there being present in said composition an amount of acid from the reactants and catalyst forming the alkyd resins and melamine-formaldehyde resin as will reduce the interfacial tension between the surface of the leafing aluminum pigment particles to wet said pigment particles with said resin and thereby prevent flotation of said particles in the film and impair the silvery appearance of the aluminum pigmented film, said acid being a member of the group consisting of formic acid, maleic acid and phthalic acid, and a stabilizing agent soluble in said hydrocarbon thinner which retards the leaf impairing characteristics of said acid in said composition for said leafing aluminum pigment, said stabilizing agent consisting of the addition salt product of a saturated fatty acid having at least 12 carbon atoms and an amine of the formula $R_3NHR_4$ where $R_3$ is an alkyl radical and $R_4$ is a radical selected from the group consisting of alkyl and hydrogen, the amount of said addition salt being from about 3.9% to about 10.8% of the weight of combined leafing aluminum pigment and synthetic resin.

2. A synthetic resin composition as claimed in claim 1 wherein said saturated fatty acid of said addition salt stabilizer agent is stearic acid and said amine is dibutyl amine.

3. A synthetic resin composition as claimed in claim 1 wherein said saturated fatty acid of said addition salt stabilizer is stearic acid and said amine is methyl amine.

4. A synthetic resin composition as claimed in claim 1 wherein said saturated fatty acid of said addition salt stabilizer is stearic acid and said amine is octadecyl amine.

5. A synthetic resin composition as claimed in claim 1 wherein said saturated fatty acid of said addition salt stabilizer is stearic acid and said amine is diethyl amine.

6. A synthetic resin composition as claimed in claim 1 wherein said synthetic resin is a mixture of alkyd resin having an acid number of less than about 8 and melamineformaldehyde resin.

7. A synthetic resin composition as claimed in claim 1 wherein said synthetic resin is styrenated alkyd resin having an acid number less than about 8.

References Cited in the file of this patent

UNITED STATES PATENTS

| 2,178,181 | McMahan | Oct. 31, 1939 |
| 2,234,164 | Harris | Mar. 11, 1941 |
| 2,267,240 | Kummel | Dec. 23, 1941 |
| 2,305,379 | Detrick et al. | Dec. 15, 1942 |
| 2,587,267 | Wray et al. | Feb. 26, 1952 |
| 2,587,268 | Roberts | Feb. 26, 1952 |

FOREIGN PATENTS

| 483,814 | Great Britain | Apr. 22, 1938 |
| 665,710 | Great Britain | Jan. 30, 1952 |

OTHER REFERENCES

Edwards: Aluminum Paint and Powder, pp. 46–62, Reinhold Pub. Corp. (1936). (Copy in S. L.)